United States Patent

[11] 3,631,862

[72] Inventors Edward William Rowland-Hill
 Lancaster;
 Edwin O. Margerum, Paradise, both of Pa.
[21] Appl. No. 51,251
[22] Filed June 30, 1970
[45] Patented Jan. 4, 1972
[73] Assignee Sperry Rand Corporation
 New Holland, Pa.

[54] SUPPORTING AND ADJUSTING MEANS FOR AGRICULTURAL MACHINES SUCH AS COMBINE HARVESTERS
11 Claims, 8 Drawing Figs.

[52] U.S. Cl. .................................................. 130/27 L,
 130/27 T
[51] Int. Cl. ........................................................ H01f 12/28
[50] Field of Search............................................ 130/27 R,
 27 L, 27 T; 56/DIG. 15

[56] References Cited
UNITED STATES PATENTS
1,334,910  3/1920  Kuntz........................... 130/27 L
3,470,881  10/1969 Knapp et al.................... 130/27 T
3,552,396  1/1971  Gerhardt et al................ 130/27 L
2,577,329  12/1951 Irvine............................ 130/27 L Primary Examiner—Antonio F. Guida
Attorneys—Joseph A. Brown, John C. Thompson, James J. Kennedy and George C. Bower ABSTRACT: Supporting and adjusting mechanism for concaves of agricultural machines such as combine harvesters. The mechanism comprises cams for supporting the concaves on fixed parts of the frame and supporting linkages having different transmission ratios interconnecting the concaves at different points thereof and the cams for supporting the concaves via said supporting linkages and cams on the framework. Adjustment linkages are connected to an adjustment handle or spindle located proximate the driver's place and the cams for adjusting the position of the concaves with respect to the rotating threshing elements, via said adjustment linkages, cams and supporting linkages. The arrangement of the elements being so that the forces actuated on the concaves are transmitted to the frame via the supporting linkages and the cams and also that different infinite adjustments of the position of the concaves are possible.

INVENTORS
EDWARD WILLIAM ROWLAND-HILL
EDWIN O. MARGERUM
BY their ATTORNEY
George C. Bower INVENTORS
EDWARD WILLIAM ROWLAND - HILL
EDWIN O. MARGERUM
BY their ATTORNEY
George C. Bower

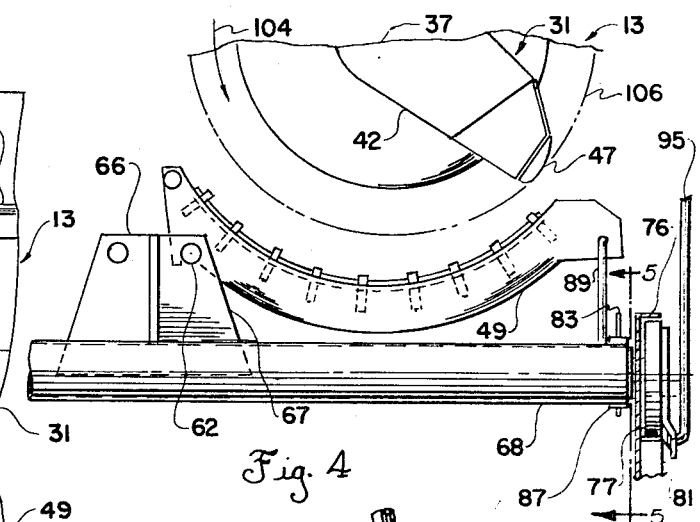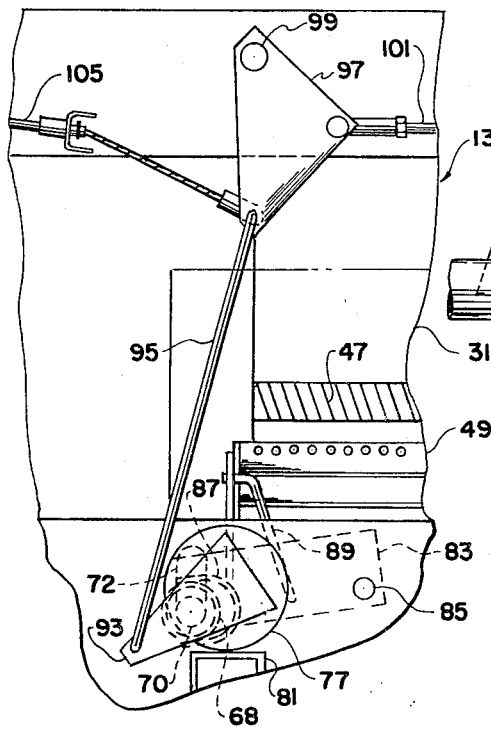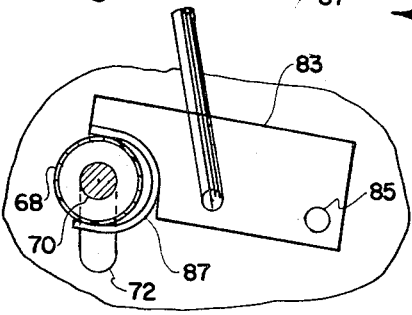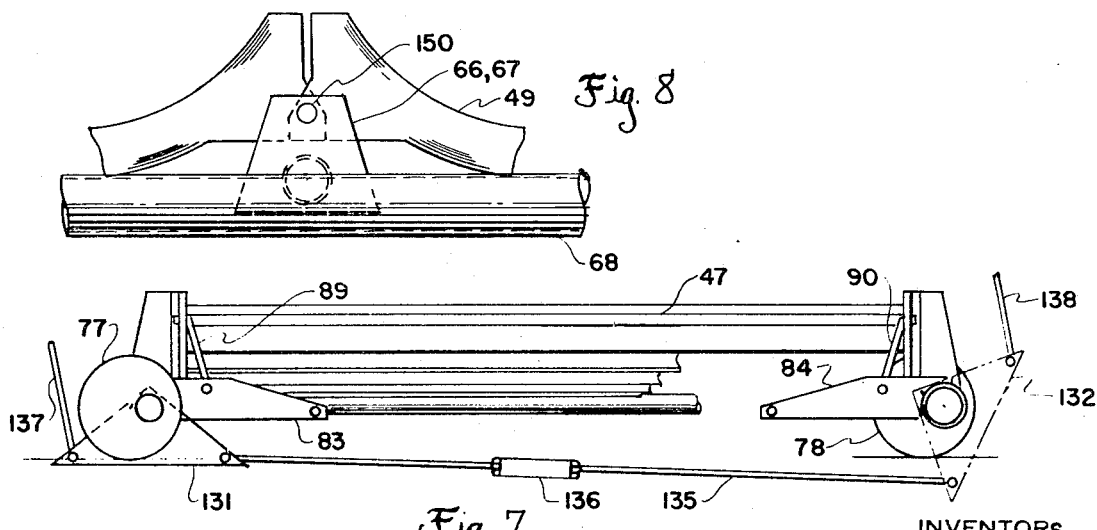

3,631,862

SUPPORTING AND ADJUSTING MEANS FOR AGRICULTURAL MACHINES SUCH AS COMBINE HARVESTERS

BACKGROUND OF THE INVENTION

1. Field of the Invention

The invention relates to the field of agricultural machines having concaves such as combine harvesters and more especially to devices for supporting the concaves of such machines and for adjusting the position of the concaves with respect to the threshing drum.

The present invention has particularly special advantages when applied on the so-called axial-flow-type combines, but may also be applied on the conventional type of combines; this means on combines having threshing means comprising a concave and cooperative threshing drum extending perpendicular to the intended direction of travel.

The present invention will be described with reference to a twin-rotor axial-flow-type combine. Axial-flow-type combines have a generally cylindrical casing with a concave and succeeding grate for cooperating with rasp bars and blades mounted on a rotor to form a threshing and separating section and a separating section. The crop material is fed to the threshing and separating section by means of auger-shaped conveyor means provided in front of said threshing and separating section, which themselves receive the crop material from a so-called straw elevator. A mat of crop material is formed which is carried around by the rotor for threshing the material. Flights are usually provided along the inner surface of the casing to move the crop material axially through the casing.

A twin-rotor axial-flow-type combine comprises two cylindrical casings each having a concave and a succeeding grate for cooperating with rasp bars and blades mounted on two rotors, each of them being located in one of said cylindrical casings. Both casings and rotors being provided parallel and in close relationship with respect to one another.

2. Description of the Prior Art

It has been known in the arts of conventional combines to support the concave by means of arms, provided with openings at their lower ends for receiving studs, which are provided on the concave side edges and which extend through slots provided in the combine casings, said arms are pivotally connected at each side of the combine casing to pivot arms, which for concave adjustment can be swung around their pivot points.

The construction of the twin-rotor axial-flow-type combine requires more complicated supporting and adjusting means and makes it, therefore, almost impossible to use the conventional support. Moreover the described prior art has the disadvantage that all forces which are urged on the concave during the threshing function are transmitted to the supporting and adjusting means, which results in the requirement of heavy elements for the supporting and adjusting means, and which further results in the possibility of a less infinite adjustment.

A further disadvantage of the described supporting and adjusting means resides in the fact that they are mainly at the location of the drive of the threshing unit and other elements and of the removable covers in the casing for access to the threshing unit. This results in a bad accessibility to the supporting and adjusting means and the threshing unit inspection openings and in a complicated structure of the supporting and adjusting means in combination with the drive means and cover plates.

It has been known in the art of the axial-flow-type combines to support the concave and to adjust the position of the concave by means of pivot shafts. The shafts extend longitudinally parallel to each side of the concave and are connected to the concave on one side by means of arms. The arms are fixed to one of the shafts at one end thereof and pivotally support the concave at their other free end, and on the other side of the concave by means of arms, which are fixed to the other one of said shafts at one end thereof, while the other free end of said fixed arms is pivotally connected to a linkage, which itself pivotally supports the other longitudinal side edge of the concave. The shafts are connected to linkages spaced in front of the concave, which on actuation, to turn the shafts so as to adjust the position of the concave.

In this construction, the forces acting on the concave during the threshing function are entirely transmitted to the adjusting linkages, which also results in the possibility of a less infinite adjustment and the requirement of heavy constructive elements.

The adjusting displacement at the front and the rear side of the concave is identical. It is desirable to have a smaller displacement at the rear side with respect to the front side so as to obtain a pinching characteristic.

The location of the adjusting linkages in front of the concaves interferes with the so-called straw-elevator which has its discharge end at this location for discharging the harvested crops into the threshing part of the combine.

SUMMARY OF THE INVENTION

The clearance between rotors and concaves must be readily adjustable to allow proper threshing of various crops under a wide range of field conditions. Also, the rotor-concave clearance should decrease as the straw passes across the concave to give an increasingly vigorous threshing action.

The subject invention is directed to supporting and adjusting means for supporting the concave and adjusting the position thereof without any of the aforementioned disadvantages, and is especially applicable on twin-rotor axial-flow-type combines. Therefore, both concaves are at their front and rear side supported by shafts which are mounted underneath the front and rear edges of said concaves and extend through long-shaped slots in the sidewalls of the combine casing. The shafts are provided at their ends outside the casing with cams for supporting the concaves on the combine framework. For adjusting the position of the concaves, the cam means on the sides of the combine casing are interconnected with each other by means of an adjustable linkage and with adjustment transmissions, for enabling the adjustment from a remote place, e.g., the operator's place. The concaves are connected to the shafts by means of different linkage means, having different transmission ratios so as to obtain infinite and exact adjusting possibilities of the concaves with respect to the threshing rotors.

The invention enables infinite adjustments and makes it possible to have light adjustment elements as the forces actuated on the concaves are almost completely transmitted to the framework via the cams. The cams are spaced outside the combine sidewalls away from dirt and crop material. The adjustment transmissions are only provided on one side of said combine sidewalls. These cams and adjustment transmissions do not at all interfere with the elevator housing or with drive means of the combine components as they are provided proximate to the longitudinal side edges of the concaves, and the drive means on an axial-flow-type combine are mainly located at the rear side thereof. The arrangements according to the invention also enable a good access to the threshing units as all linkages are spaced above or underneath the concaves.

Other objects and advantages will appear from the following description of an example of the invention when considered in connection with the accompanying drawings and the novel features will be particularly pointed out in the appended claims.

BRIEF DESCRIPTION OF THE DRAWINGS

FIG. 4 is a similar view to that shown in FIG. 3, only showing one-half of the threshing unit, but with the concave in its lower position.

FIG. 5 is an enlarged cross-sectional view taken on line 5—5 of FIG. 4.

FIG. 6 is a partial side view of the adjusting and supporting means with the concave in its lower position.

FIG. 7 is a side view of the adjusting and supporting means in a modified construction.

FIG. 8 is a partial cross-sectional view similar to that taken on line 3—3 of FIG. 2, showing a modified supporting construction.

DESCRIPTION OF THE PREFERRED EMBODIMENT

Introduction

In the following description, right- and left-hand references are determined by standing to the rear of the combine and facing the direction of travel. Inside and outside references are indicating the space between both concaves, respectively, and the spaces opposite to the inner space.

Figure 1:
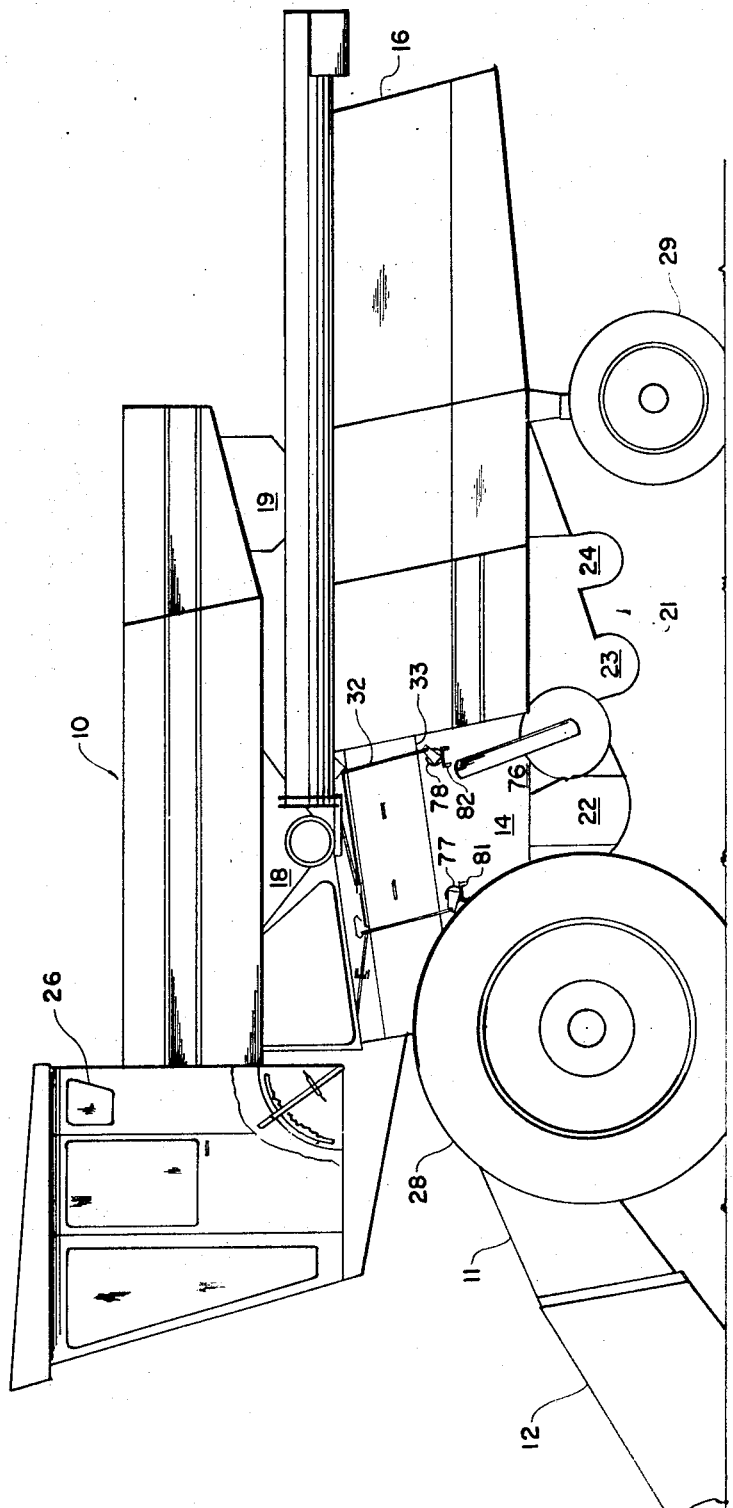
FIG. 1 is a side view of an axial-flow-type combine.

In FIG. 1 the combine 10 is illustrated with a crop elevator 11 and a header 12 mounted on front. The main frame or housing 14 internally supports the crop threshing and separating means 13, and the grain-cleaning means. The rear housing 16 encloses the discharge means extending rearwardly from the threshing and separating means. On top of the combine is the grain tank 18 and the internal combustion engine 19 positioned to the rear of the tank. The blower, grain auger and tailings auger are enclosed in the lower housing 21 comprising the blower housing 22, the grain auger trough 23 and tailings auger trough 24. The operator's cab 26 extends forwardly from the main housing 14 and over the crop elevator 11 for a clear view of the header. The combine is conventionally supported by two large drive wheels 28 on front and two small steering wheels 29 on the rear.

The threshing and separating means 13 extends generally longitudinally in the direction of movement of the combine and have crop-feeding means at the front for receiving crop from the header and elevator. The crop is then carried axially and circumferentially to be threshed to separate the grains from the crop material. The crop material without the grains is discharged at the rear to a conveyor which carries the crop material rearwardly for discharge from the combine.

In this preferred embodiment the threshing and separating means are described as two units in adjacent side-by-side relation. However, the invention described and shown on this embodiment is equally applicable to a single threshing and separating unit and a conventional threshing unit.

Threshing and Separating Means

The threshing and separating means have basically two rotors 30, 31 and two generally cylindrical casings 33 extending longitudinally along the intended direction of travel and having removable inspection cover plates 32.

The threshing rotors have shafts 36, 37. The shafts support feeding augers, generally elliptically shaped spiders 41, 42 and separating rotors (not shown). The general elliptically shaped spiders support rasp bars 46, 47 in proximate relationship to the concaves 48, 49 to be described further on, for threshing the crop material in cooperation with the concaves. The separating rotors comprise blades extending axially adjacent to the rear part of the casings 33 for separating the grain from the crop material, and for discharging the remainder of crop material to the ground or to further crop treating and conveying means. The casings 33 respectively have longitudinally extending concaves 48, 49 along the bottom for threshing the crop material in cooperation with the threshing rotors. Curved vanes on the inner side of the tops of the casings transport the crop along the axis of the threshing units and deliver it to the separating units. The casings further comprise separating gratings along the bottom for separating the grain from the crop material in cooperation with the separating rotors. Curved vanes on the inner side of the tops of the casings trans-port the remainder of the crop along the axis of the separating units and assist in discharging it from the combine or to further crop treating and conveying means.

Supporting and Adjusting Means of the Concaves

The two concaves 48, 49 are at their inner sides and both at their front and rear edges hinged at 61, 62 to supports 66, 67, which are welded to tubes 68, 69. The tubes receive shafts 70, 71 extending through them across the total width of the combine housing and pivotally bearing the tubes by means of bearing elements 72, 73. The shafts 70, 71 extend through generally vertical slots 72, 73 provided in the combine side sheets 75, 76 which allow up and down movement of said shafts. The shafts 70, 71 are provided with cams 77, 78 at each of their free ends for supporting the concaves on support projections 81, 82.

Links 83, 84 are at one end pivotally connected to the combine side sheets at 85, 86 and are provided with bearing means 87, 88 at their other end, which cooperate with the aforesaid tubes 68, 69. Links 89, 90 interconnect the outer concave side edges with the pivotally mounted links 83, 84 at positions intermediate to their pivoting axis 85, 86 and bearing means 87, 88.

The adjusting transmissions comprise brackets 93, 94 keyed to the cams 77, 78; brackets 97, 98 and links 95, 96 which interconnect brackets 93, 94 to brackets 97, 98. The brackets 97, 98 supported at 99, 100 and interconnected with each other by link 101 having a turnbuckle 102. The adjusting transmissions are interconnected with an adjustment handle or spindle (not shown in the drawings), provided near to the operator's seat by means of two Bowden-cable transmissions 105, 106.

Operation

During operation the threshing and separating rotors 30, 31 are turning in opposite directions and directed downwardly at their inner sides, as indicated by arrows 103, 104. The cut material is fed by the elevator 11 towards the crop-feeding means, on the rotor shafts. The crop-feeding means feed the crop longitudinally into the threshing means. The crop material enters between the rasp bars 46, 47 and the concaves 48, 49 and is moved along a spiral-shaped path through the threshing means. The grains are threshed and most of them are separated and discharged through the concaves 48, 49. The remainder of crop material, this means mostly straw, is further treated in the separating means for further separating the threshed grain from the straw. The straw is carried through this separating means in a generally spiral-shaped path to the end of the rotors and discharged.

It is necessary to adjust the position of the concaves with respect to the paths 105, 106 of the rasp bars to adapt the equipment to the different crop varieties and crop conditions. The concaves are mounted in such a manner as to obtain a decreasing clearance or pinching characteristic, between the concaves and the rotors, in the direction of movement of the rotors.

For lowering the concaves with respect to the rotors, the adjusting handle or spindle is displaced in such direction that the Bowden-cable 106 turns bracket 97 and via link 101 and also turns bracket 98 so as to lower both links 95, 96. This displacement of links 95, 96 urges via brackets 93, 94 the cams 77, 78 to turn upon the projections 81, 82. This results in a vertical lowering of shafts 70, 71 with respect to the vertical slots 72, 73. The tubes 68, 69 are lowered over the same distance which results in a downwardly hinging of the links 83, 84 and the outer edges of the concaves connected therewith. The inner edges of the concaves are lowered over a greater distance as the vertical displacement of support members 66, 67 is the same as the vertical displacement of the tubes 68, 69 while the vertical displacement of the lower pivot shafts of the links 89, 90 is less than the vertical displacement of said tubes. This results in a decreasing clearance or pinching characteristic between the concaves and the rasp bars, seen in the direction of movement of said bars, which is highly desirable for obtaining an easy supply of crop between both the concaves and rasp bars and an aggressive threshing function.

For decreasing the clearance between the concaves and the rasp bars, the adjustment handle or spindle is actuated in such a manner that the other Bowden-cable 105 is pulled, which results in completely the reverse displacement of any of the above described elements.

Adjusting turnbuckle 102 and the length of the Bowden-cables 105 and 106 provides a preadjustment of the position of the concaves with respect to the rasp bars in the longitudinal direction of the threshing means and also provides an adjustment of the longitudinal pinching or decreasing clearance characteristic, which is highly desirable for the same reasons as previously indicated.

Figure 2:
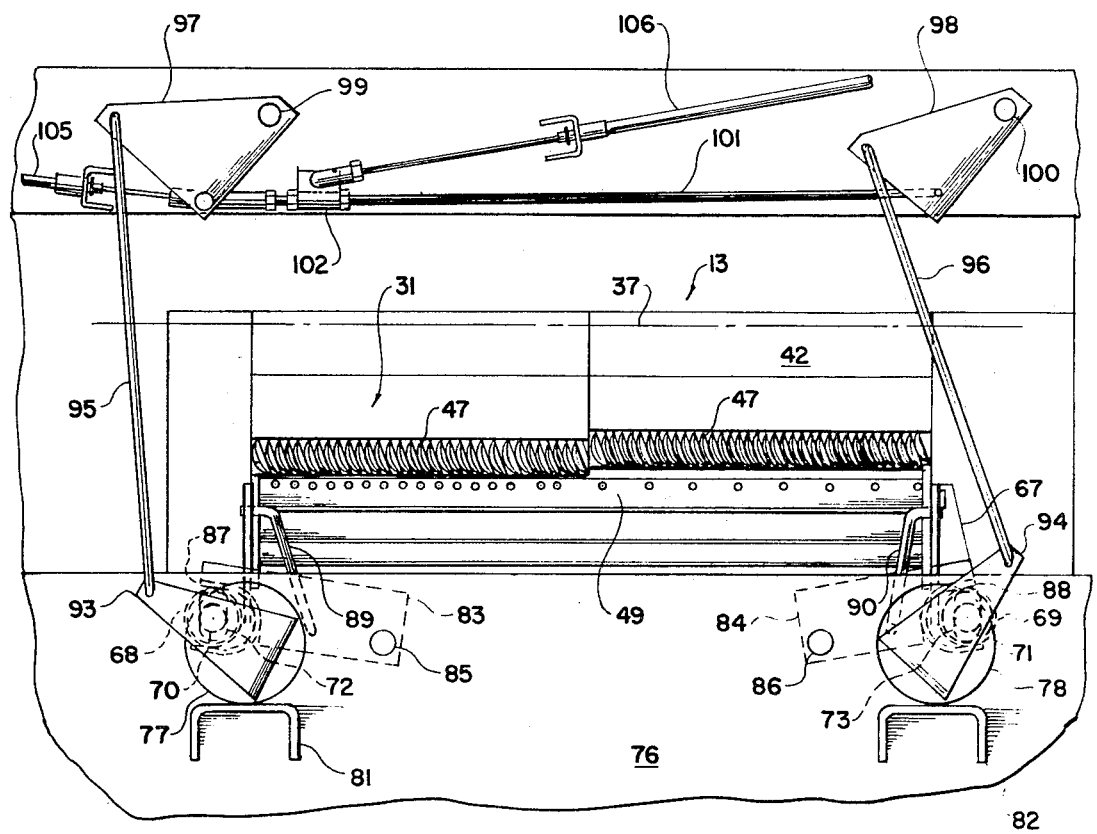
FIG. 2 is an enlarged side view of a part of the axial flow combine wherein the cover plate is removed and incorporating the invention in more details.
Figure 3:
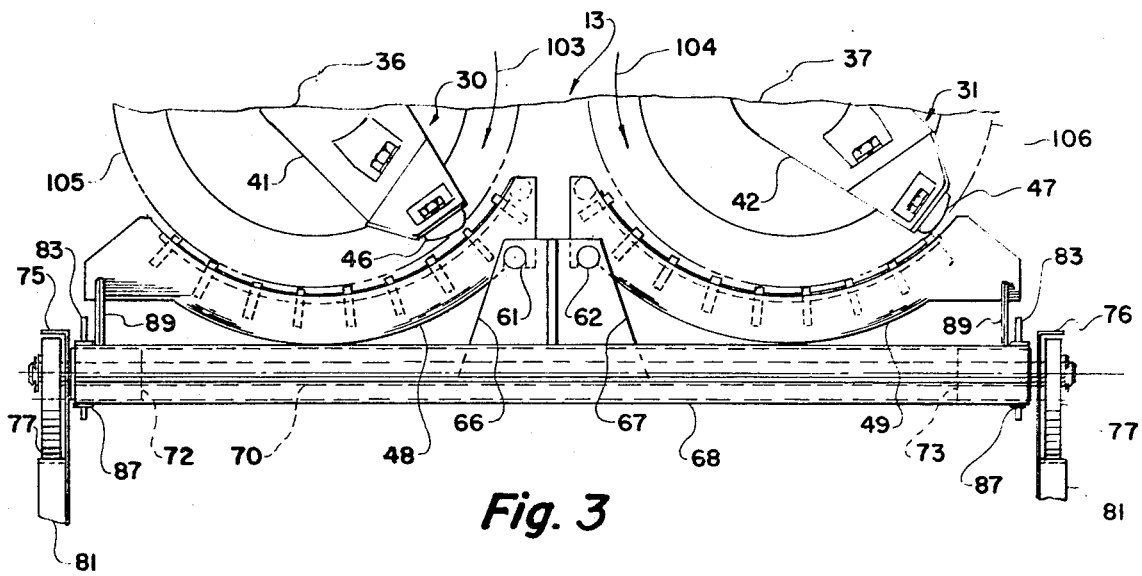
FIG. 3 is an enlarged cross-sectional view of a part of the axial flow combine taken on line 3—3 of FIG. 2.

When the turnbuckle 102 is adjusted in such a way that the brackets 97, 98 and the links 95, 96 have a different position with respect to each other, as shown in FIG. 2, then the displacement of the front side of the concaves will differ from the displacement of the rear side of said concaves, as it will readily be understood from the structure of the adjusting device.

Modification

It will readily be understood that the above described supporting and adjusting means may be applied on single rotor axial flow combines, on axial flow combines having more than two rotors and on the conventional type of combines.

FIG. 7 shows a modified supporting and adjusting means in which the cams 77 and 78 have brackets 131, 132 keyed to them, and which are interconnected with each other by means of a linkage 135 with the turnbuckle 136. The brackets are connected to the adjustment handle or spindle (not shown) provided near the operator's position by means of Bowden-cables 137, 138, respectively. The supporting means may be completely the same as previously described.

The operation of the modified adjusting means is basically the same as previously described and is as follows: When actuating the adjustment handle or spindle on the operator's platform in one or the other direction, the first or the other Bowden-cable, 137, respectively 138 will be pulled so as to make the brackets 131, 132 and cams 77, 78 turn in one or the other direction, which rotation results in the adjustment of the position of the concaves as previously described.

FIG. 8 shows a modified construction of the supports 66, 67 having a single pivoting connection shaft 150 for both concaves.

The above described invention permits an infinite adjustment of the position of the concaves, with respect to the threshing rotors including pinching characteristics in the turning direction of the rotors, and also in the longitudinal direction of the threshing units. The forces actuated on the concaves are almost completely transmitted to the combine framework. This results in an easy and infinite adjustment possibility and the use of relatively light elements for the adjusting means. The supporting and adjusting means are arranged in such a manner that easy access to the threshing units from the side walls of the combine is guaranteed without interfering with the other components of the combine, such as the driving means and the elevator housing. The supporting cams are provided outside the combine housing which means that they also do not interfere with the threshing function and are away from dirt.

Having described the preferred embodiment of the invention it will be understood that various changes in the details and arrangements of parts, which have been herein described and illustrated in order to explain the nature of the invention, may be made by those skilled in the art within the principle and scope of the invention as expressed by the appended claims.

What is claimed is:

1. A mobile axial flow threshing and separating machine comprising
    a frame for supporting the axial flow threshing and separating machine elements;
    longitudinally extending concaves and grates;
    threshing and separating rotor means mounted in close relationship to said concaves and grates for cooperating therewith for threshing and separating the grain from the remainder of the crop materials;
    cam means supported on the frame;
    linkage means between said concaves and said cam means comprise a first hollow support member and a second hollow support member, each transversely extending across the machine housing proximate to the front and rear edges of said concaves, respectively for supporting in combination with said cam means the concaves on the frame;
    shafts extending through said support members and through generally vertical slots provided in the side walls of said machine frame and being keyed to said cam means and pivotally supporting said support members for pivotally interconnecting said cam means and support members and for vertically adjusting the position of said support members responsive to an angular displacement of said cam means; and
    adjustment linkages connected to the cam means for adjusting the position of the concaves with respect to the threshing rotor means.

2. A mobile axial-flow-type threshing and separating machine as set forth in claim 1, wherein
    bracket means and pivoting connecting elements are provided said bracket means keyed to said supporting members; and
    said pivoting connecting elements pivotally connecting said concaves to said bracket means and supporting said concaves on said support members for vertical adjustment of the concaves responsive to the vertical displacement of said support members.

3. A mobile axial-flow-type threshing and separating machine as set forth in claim 1, wherein
    first and second linkage means are provided
    said first linkage means hingingly supported to said frame at one end thereof and displaceably supported by said support members at the other end; and
    said second linkage means hingingly connected at one end thereof to the concaves and hingedly connected at the other end thereof to said first linkage means at a position of said first linkage means in between both ends, for supporting said concaves to said support members and for vertically adjusting the position of said concaves responsive to the vertical displacement of said support members and an angular displacement of said cams.

4. A mobile axial flow threshing and separating machine as set forth in claim 1, wherein said adjustment linkages connected to said cam means for adjusting the position of said concaves with respect to said rotating threshing means comprises:
    transmission means interconnecting said adjusting member, located near the operator's location with said cam means at a point spaced from the axis of the linkage means for angularly displacing means on actuation of said adjusting members.

5. A mobile axial flow threshing and separating machine as set forth in claim 4, wherein said transmission means comprises
    bracket means pivotingly mounted to said frame;
    linkage means pivotingly interconnecting said cam means and said bracket means for angularly displacing said cam means responsive to the displacement of said bracket means;
    an additional linkage member interconnecting said bracket means for displacing said bracket means simultaneously;
    Bowden-cable transmissions between said adjusting member preferably located near the operator's location and said bracket means for providing said bracket means on actuation of said adjusting member and for hinging the cam means and for vertically adjusting the position os said concaves.

6. A mobile axial flow threshing and separating machine as set forth in claim 5, wherein the axial flow threshing and separating machine has removable sidewall inspection cover plates; the said bracket means, said linkage means and additional linkage member being located around one of said removable inspection cover plates for enabling easy mounting and removing of the cover plate to and from the frame and for enabling easy access to the threshing equipment.

7. A mobile axial flow threshing and separating machine as set forth in claim 5, wherein said additional linkage member comprises a turnbuckle for adjusting the length between the said bracket means and for in combination with the adjusting of the length of the Bowden-cable transmissions to preadjust the position of said concaves with respect to said rotors and to adjust the longitudinal pinching characteristic between said concaves and said rotors.

8. A mobile axial flow threshing and separating machine as set forth in claim 4, wherein the transmission means comprise
- a linkage member interconnecting the cam means with each other at one side of the machine, for simultaneously giving the cam means an angular displacements;
- Bowden-cable transmissions between the adjusting member preferably located near the operator's location and the cam means for pivoting the cam means on actuation of the adjusting member and for vertically adjusting the position of the concave.

9. A mobile axial flow threshing and separating machine as set forth in claim 4, wherein the adjustment linkages, connected to the cam means for adjusting the position of the concaves, and comprising transmission means interconnecting of the adjusting member with the cam means are located at one side of the machine.

10. A mobile axial flow threshing and separating machine comprising:
- a frame for supporting axial flow threshing and separating machine elements and having sidewalls with first and second generally vertical slots;
- longitudinally extending concaves having outer edges and adjacent inner edges;
- threshing and separating rotor means mounted in a close relationship to said concaves for cooperating therewith for threshing and separating grain from the remainder of crop material;
- cam means supported on said frame for transmitting the forces urged on said concaves to said frame;
- first and second hollow supporting members transversally extending across the machine housing proximate to said front and rear edge of the concaves;
- shaft means extending through said supporting members and through said generally vertical slots in said side walls and being keyed at their outer ends to said cam means and pivotingly supporting said support members for vertical displacement of said support members responsive to angular displacement of said cam means;
- bracket means keyed to said supporting members;
- pivoting connecting elements mounted on said bracket means and concaves for pivotingly connecting said concaves at their inner edges to said bracket means and supporting said concaves on said supporting members for vertical adjustment of said concaves responsive to the vertical displacement of said supporting members and the angular displacement of said cam means;
- first linkage means hingingly supported to said frame at one end thereof and displaceably supported at their other end on said support members;
- second linkage means hingedly connected at one end thereof to said concaves and hingedly connected at the other end thereof to said first linkage means at a position of said first linkage means in between both ends for supporting said concaves at their outer edges to said supporting members and for vertically adjusting the position of said concaves over a smaller displacement than at their inner edges responsive to the vertical displacement of said supporting members and an angular displacement of said cam means.

11. A mobile axial-flow-type of threshing and separating machine comprising
- a main frame for supporting axial flow threshing and separating means,
- axial flow threshing and separating means having a longitudinally extending concave having a front and rear end,
- threshing and separating rotor rotatably mounted in said main frame in close relationship to said concave for cooperating therewith for threshing and separating the grain from the remainder of the crop material;
- cam means supported on the frame,
- linkage means between said concave and said cam means comprising first and second hollow support members parallel to one another and extending transversely approximately to the front and rear end of said concave, respectively, for supporting in combination with said cam means the concave on said frame;
- shafts extending through said support members and through generally vertical slots provided in said machine frame and being keyed to said cam means and pivotally supporting said support members and for vertically adjusting the position of said cam means; and
- adjustment linkages connected to said cam means for adjusting the position of said concave with respect to said rotor means.

* * * * *